(12) United States Patent
Robert

(10) Patent No.: US 7,396,889 B2
(45) Date of Patent: Jul. 8, 2008

(54) METHOD FOR PREPARING A DIENE ELASTOMER

(75) Inventor: Pierre Robert, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/783,665

(22) Filed: Apr. 11, 2007

(65) Prior Publication Data

US 2007/0255029 A1     Nov. 1, 2007

(30) Foreign Application Priority Data

Apr. 14, 2006    (FR) ................... 06 03594

(51) Int. Cl.
*C08F 4/54* (2006.01)
*C08F 36/04* (2006.01)
*C08F 2/06* (2006.01)

(52) U.S. Cl. .............. 526/153; 526/88; 526/161; 526/162; 526/164; 526/340.4; 526/907

(58) Field of Classification Search ................ 526/153, 526/162, 340.4, 164, 907, 88, 161
See application file for complete search history.

(56) References Cited

U.S. PATENT DOCUMENTS

| 6,121,429 | A | 9/2000 | Balducci et al. |
| 7,094,849 | B2 * | 8/2006 | Luo et al. .................. 526/164 |
| 2003/0162920 | A1 * | 8/2003 | Windisch et al. ............ 526/164 |
| 2004/0009870 | A1 | 1/2004 | Laubry |

FOREIGN PATENT DOCUMENTS

| EP | 0 919 573 A1 | 6/1999 |
| GB | 2 225 586 A | 6/1990 |
| JP | 59-045311 A | 3/1984 |

OTHER PUBLICATIONS

French Search Report issued in corresponding French Application No. 06/03594.

* cited by examiner

*Primary Examiner*—Fred M Teskin
(74) *Attorney, Agent, or Firm*—Buchanan Ingersoll & Rooney PC

(57) ABSTRACT

A method for preparing a diene elastomer, such as a butadiene homopolymer or copolymer, in particular, a polybutadiene, with a high level of cis-1,4 linkages that has both a Mooney viscosity greater than or equal to 40 and a polydispersity index of less than 2.1. The method comprises a reaction of a catalyst system with at least one conjugated diene monomer to be polymerized and the catalyst system is based on at least:

optionally one preforming conjugated diene;

one salt of one or more rare earth metals;

an inert hydrocarbon-based solvent;

an alkylating agent comprising an allyl derivative of aluminum of formula $R''_n AlR'_{3-n}$, where R' is a saturated or unsaturated alkyl group or else a hydride, where R" is an allyl group and where n is an integer inclusively between 1 and 3; and a halogen donor that belongs to the family of alkylaluminum halides, excluding alkylaluminum sesquihalides.

23 Claims, No Drawings

METHOD FOR PREPARING A DIENE ELASTOMER

This application claims priority under 35 U.S.C. §119 to patent application Ser. No. 06/03594 filed in France on Apr. 14, 2006, the entire contents of which is incorporated by reference.

BACKGROUND OF THE INVENTION

1. Field of the Invention

The present invention relates to a method for preparing a diene elastomer, such as a butadiene homopolymer or copolymer. The invention especially applies to the production of a polybutadiene with a high level of cis-1,4 linkages that has both a Mooney viscosity greater than or equal to 40 and a reduced polydispersity index.

2. Description of the Related Art

In order to prepare butadiene homopolymers or copolymers having a high level of cis-1,4 linkages, it is known to use catalyst systems based on:

- a salt of rare-earth metal(s) in solution in a hydrocarbon-based solvent;
- an alkylating agent of this salt formed from an alkylaluminum; and
- an alkylaluminum halide.

Patent document EP-B-207 558 teaches, in order to obtain a butadiene homopolymer or copolymer having a Mooney viscosity that is more or less independent of the degree of conversion of the monomers:

- initiating the polymerization reaction with a catalyst system comprising:
  a) a neodymium compound chosen from neodymium oxide, and neodymium alkoxides, phenates and carboxylates;
  b) an organic compound having a hydroxyl or carboxyl group;
  c) a non-halogenated organometallic aluminum compound; and
  d) a halogenated compound chosen from secondary or tertiary alkyl halides, organic acid halides, metal and organometallic halides, hydrogen halide acids and halogens, so that the aluminum/neodymium molar ratio in this catalyst system varies from 10 to 30; and
- adding in continuous or batch mode, after the start of the polymerization reaction and over a time period at least equal to half of the total duration of this reaction, a given amount of this compound c) until an aluminum/neodymium molar ratio ranging from 20 to 80 is obtained.

As indicated in the embodiment examples of this document, the purpose of this addition of the organoaluminum compound after the initiation of the polymerization reaction is to obtain Mooney viscosities ML (1+4) that are always substantially below 40, in comparison with the Mooney viscosities that are obtained by adding this compound at the same time as the catalyst system, which does not give these polybutadienes that are well suited for use in tire cover treads.

Patent documents WO-A-02/38636 and WO-A-03/097708 in the name of the Applicants teach, for obtaining polybutadienes, the use of a "preformed" type catalyst system based on at least:

- one preforming conjugated diene, such as butadiene;
- one organic phosphoric acid salt of one or more rare-earth metal(s), which salt is in suspension in at least one saturated and aliphatic or alicyclic, inert hydrocarbon-based solvent;
- an alkylating agent formed from an alkylaluminum of formula $AlR_3$ or $HAlR_2$, and
- a halogen donor that belongs to the family of alkylaluminum halides excluding alkylaluminum sesquihalides.

The polybutadienes obtained using this catalyst system have, in particular, a polydispersity index less than 2.1 and a Mooney viscosity ML (1+4) at 100° C. greater than or equal to 40. These combined characteristics make these polybutadienes well suited for use in tire cover treads.

BRIEF SUMMARY OF THE INVENTION

Within the scope of research having the aim of adapting the polymerization methods to the diene elastomers to be obtained and to the polymerization conditions encountered, the Applicants have unexpectedly discovered that the use, as an alkylating agent, of allyl derivatives of alkylaluminum allow excellent control of the molecular weight distribution and make it possible to obtain diene elastomers having high levels of cis-1,4 linkages, such as butadiene homopolymers or copolymers, which have, in particular, a predetermined Mooney viscosity ML (1+4) at 100° C. that is greater than or equal to 40 and a polydispersity index Ip that is less than or equal to 2.1.

DETAILED DESCRIPTION OF THE INVENTION

According to the invention, this specific catalyst system is based on at least:

- optionally one preforming conjugated diene;
- one salt of one or more rare-earth metals, such as a salt of a carboxylic acid or of an organic phosphoric acid;
- an inert hydrocarbon-based solvent;
- a specific alkylating agent comprising an allyl derivative of aluminum of formula $R''_n AlR'_{3-n}$, where R' is a saturated or unsaturated alkyl group or else a hydride, where R" is an allyl group and where n is an integer inclusively between 1 and 3; and
- a halogen donor that belongs to the family of alkylaluminum halides, excluding alkylaluminum sesquihalides.

It should be noted that these combined characteristics of high levels of cis-1,4 linkages, of sufficiently high Mooney viscosity and of controlled molecular weight distribution (translating into a reduced polydispersity index $Ip \leq 2.1$), make the diene elastomers thus obtained particularly well suited for use in tire cover treads.

Of course, the term "based on" used to define the constituents of the catalyst system is understood to mean the preformed reaction product or products of these constituents optionally including in that case this preforming conjugated diene, or the in situ reaction product or products of these constituents or the catalyst system resulting from the premixing of the constituents.

As the preforming conjugated diene that can be used to preform the catalyst system according to the invention, mention may be made, preferentially, of 1,3-butadiene.

Mention may also be made of 2-methyl-1,3-butadiene (or isoprene), 2,3-di($C_1$-$C_5$ alkyl)-1,3-butadienes such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, or any other conjugated diene having between 4 and 8 carbon atoms.

It should be noted that the preforming conjugated diene/salt of rare-earth metal(s) molar ratio may have a value ranging from 10 to 70.

As the salt of rare-earth metal(s) that can be used in this catalyst system according to the invention, the following may advantageously be used:

in a first instance: a carboxylic acid salt of rare-earth metal(s), such as a neodymium carboxylate and for example neodymium tris(2-ethylhexanoate), neodymium naphthenate or neodymium versatate; or else in a second instance: a phosphoric acid salt of rare-earth metal(s).

This salt of rare-earth metal(s) may be used in the form of a more or less viscous solution which may include free acid or residual water depending on the preparation conditions, that are moreover known per se.

The salt of rare-earth metal(s) may be prepared either in continuous mode or in batch mode as described in patent document WO-A-02/38636. When the salt of one or more rare-earth metals is in the form of a non-hygroscopic powder, the time it takes to dissolve in the solvent varies depending on the dissolution conditions used.

Thus, according to a first embodiment, the salt of rare-earth metal(s) in the form of a non-hygroscopic powder having a slight tendency to agglomerate at room temperature is dissolved in an aliphatic or alicyclic inert hydrocarbon-based solvent of low molecular weight, such as cyclohexane, methylcyclohexane, pure hexane or hexane in the form of a cut of aliphatic and alicyclic solvents with a boiling point ranging from 65° C. to 72° C., n-heptane or a mixture of these solvents. Preferentially, methylcyclohexane is used as the inert hydrocarbon-based solvent.

According to another preferential embodiment, as for example described in patent document WO-A-00/64 910, the salt of rare-earth metal(s) to be reacted, is synthesized "in situ" directly in the solvent, that is to say that the reaction of the phosphoric acid derivative with the rare-earth metal compound is carried out in the presence of said solvent in order to form the salt of rare-earth metal(s) in said solvent, said salt being in the form of a more or less viscous solution that contains the compound of formula $Nd(P)_3.x\,PH$, in which x is a number, whether an integer or not, greater than or equal to 0, and PH represents a free acid which is a phosphoric acid diester of formula $[(RO)_2\,(HO)P=0]$ resulting from the "in situ" synthesis.

According to another embodiment, the solution of rare-earth metal prepared according to the first embodiment may contain free acid of formula $(RO)_2(HO)P=0$ that is added during or after dissolving the salt in powder form.

As salts of said rare-earth metal(s) that can be used in the method according to the invention, mention may preferably be made of neodymium, cerium or didymium organophosphates and preferentially neodymium tris[di-t-butyl phosphate], neodymium tris[dipentyl phosphate], neodymium tris [dioctyl phosphate], neodymium tris[bis(2-ethylhexyl) phosphate], neodymium tris[bis(1-methylheptyl) phosphate], neodymium tris[bis(p-nonylphenyl) phosphate], neodymium tris[butyl(2-ethylhexyl) phosphate], neodymium tris[(1-methylheptyl)(2-ethylhexyl) phosphate], neodymium tris[(2-ethylhexyl)(p-nonylphenyl) phosphate], and neodymium tris[bis(2-ethylhexyl) phosphate]. It is also possible to use, as the salt, a mixture of several organic phosphoric acid salts of a rare-earth metal.

According to a preferential example common to these embodiments, as the salt a tris[bis(2-ethylhexyl)phosphate] of said rare-earth metal or metals is used. Even more preferentially, said salt of rare-earth metal(s) is neodymium tris[bis (2-ethylhexyl) phosphate] (abbreviated below as $Nd(P)_3$).

As the inert hydrocarbon-based solvent that can be used in the catalyst system according to the invention, it is possible, for example, to use an aromatic solvent, such as toluene, or else an aliphatic or alicyclic solvent, such as n-heptane, cyclohexane or methylcyclohexane.

As the allyl derivative of aluminum, which is used specifically as the alkylating agent in the catalyst system according to the invention, advantageously an allyl derivative is used in which the allyl radical is chosen from the group formed by butadienyl, isoprenyl, oligobutadienyl and oligoisoprenyl derivatives, the number of units of these oligomers being, for example, between 1 and 10, preferentially 5.

According to another feature of the invention, said allyl derivative of aluminum preferably comprises the product of the reaction of an allyl derivative of lithium of formula R"Li, such as an (oligo)butadienyllithium or an (oligo)isoprenyllithium which is the precursor of the allyl derivative of aluminum, with a halogenating agent of formula $X_nAlR'_{3-n}$, where X is a halogen and where R', R" and n are as defined above.

Said allyl derivative of lithium of formula R"Li is the reaction product of a conjugated diene, such as 1,3-butadiene or isoprene, with an alkyllithium, such as sec-butyllithium, in an aromatic, aliphatic or cycloaliphatic solvent, such as cyclohexane or methylcyclohexane. Said allyl deriviative of lithium could also be obtained by any other method of synthesis known to a person skilled in the art for obtaining an alkyllithium. It should be noted that said allyl derivative of lithium R"Li must be used in the purest state possible, that is to say, free from any traces of residual alkyllithium, such as sec-butyllithium.

According to a first implementation method, the allyl derivative of lithium and the halogenating agent are reacted in stoichiometric amounts.

According to another preferential implementation method, said halogen donor corresponds to said halogenating agent of formula $X_nAlR'_{3-n}$ used in excess, which has only partially reacted with said allyl derivative of lithium in order to obtain said allyl derivative of aluminum.

More precisely, in this case h+x/n moles of said halogenating agent $X_nAlR'_{3-n}$ are reacted per nh moles of said allyl derivative of lithium R"Li, with $h \geq 1$, $1 \leq n \leq 3$ and $1 \leq x \leq 4$, so that this halogenating agent exerts the following two functions:

a first part [h moles relative to the salt of rare-earth metal(s)] reacts with the allyl derivative of lithium R"Li to generate the allyl derivative of aluminum $R''_nAlR'_{3-n}$ according to the reaction: $n\,R''Li+X_n AlR'_{3-n} \rightarrow R''_nAlR'_{3-n}+nLiX$, and a second part [x/n moles of halogenating agent relative to the salt of rare-earth metal(s)] forms said halogen donor to halogenate this salt.

Advantageously, h+3 moles of said halogenating agent are reacted per h moles of said allyl derivative of lithium and per 1 mole of said salt of rare-earth metal(s), i.e. x=3 and n=1.

It should however be noted that the allyl derivative of aluminum of the catalyst system according to the invention could be obtained by any other method of synthesis known to a person skilled in the art for obtaining an alkylaluminum.

According to a first embodiment of the invention in which said catalyst system is specifically formed in situ, that is to say where all the catalyst constituents, that is to say said solvent, said monomer, said salt of rare-earth metal(s), said allyl derivative of lithium, and said halogenating agent, are introduced into the reactor just before polymerization, said halogenating agent is based on chlorine or bromine, advantageously an aluminum monohalide such as a diethylaluminum halide and preferentially diethylaluminum chloride.

According to a second embodiment of the invention in which said catalyst system is specifically preformed before said polymerization reaction, that is to say by contacting the various catalyst constituents at a temperature possibly above room temperature, for example 15 minutes at 60° C., followed by ageing of the catalyst constituents before the polymerization, optionally in the presence of said preforming conjugated diene, said halogenating agent used to obtain said allyl derivative of aluminum is specifically based on chlorine or bromine, this halogenating agent then advantageously being an aluminum monohalide, such as diethylaluminum bromide.

According to a third embodiment of the invention in which said catalyst system is specifically formed by premixing, immediately before said polymerization reaction, by contacting the various constituents, that is to say the solvent, the allyl derivative of lithium, the halogenating agent in excess and the salt of rare-earth metal(s), at room temperature, optionally in the presence of said preforming conjugated diene, said halogenating agent is based on chlorine or bromine, this halogenating agent then being advantageously an aluminum monohalide such as a diethylaluminum halide.

In accordance with one or other of these three embodiments of the invention, said catalyst system is preferably obtained by directly mixing said solvent, said allyl derivative of lithium, said halogenating agent present in excess in order to obtain said alkylating agent and also said halogen donor and said salt.

Regarding said halogen donor according to the invention, it should be noted that the exclusion of alkylaluminum sesquihalides is a necessary condition for obtaining polybutadienes having both a Mooney viscosity ML (1+4) at 100° C. that is greater than or equal to 40 and a polydispersity index Ip that is less than or equal to 2.1.

According to the invention, it should be noted that the halogen donor/salt of rare-earth metal(s) molar ratio may have a value ranging from 2 to 3.5 and preferably ranging from 2.6 to 3.

According to another advantageous feature of the invention, the alkylating agent/salt of rare-earth metal(s) molar ratio in said catalyst system has a reduced value ranging from 1 to 20.

When said ratio is less than or equal to 5, the catalyst activity is very high when the salt of rare-earth metal(s) is a phosphate, the molecular weight distribution is narrow and the polydispersity index Ip is less than or equal to 2.1, whereas when this ratio is relatively high, that is to say ranging from 15 to 20, the molecular weight distribution is very wide and the polydispersity index Ip is greater than or equal to 2.5.

According to another way of implementing the method according to the invention, it is possible to introduce, separate from the catalyst system used for the polymerization reaction, in continuous or batch mode, the monomer(s) to be polymerized, a predetermined additional quantity of at least one alkylaluminum compound of formula $AlR_3$ or $HAlR_2$ or $R''_nAlR'_{3-n}$, in which R and R' represent a saturated or unsaturated alkyl group, preferably having one to twelve carbon atoms, R" represents an allyl group, n is an integer from 1 to 3 inclusively and H represents a hydrogen atom, into the polymerization reactor when it operates in batch mode or into the industrial polymerization unit when it operates in continuous mode, that is to say not at the same time and, consequently, either before or after or partly before and partly after, relative to the introduction of the advantageously preformed catalyst system used for the polymerization reaction.

Mention may be made, as alkylaluminum of formula $AlR_3$, of compounds such as trialkylaluminums, for example triisobutylaluminum, and as alkylaluminums of formula $HAlR_2$, of advantageously diisobutylaluminum hydride or an aluminum compound that advantageously is identical to that used as the alkylating agent of the catalyst system.

The amount of at least one alkylaluminum compound of formula $AlR_3$ or $HAlR_2$ or $R''_nAlR'_{3-n}$, where R, R', R" and n are as defined above, which is identical to or different from that of the alkylating agent of said catalyst system, that is added varies as a function of one or more or all of the reaction parameters listed non-limitingly below, especially the diene monomer(s) to be polymerized or copolymerized, the polymerization conditions, the desired macrostructure and/or microstructure characteristics of the diene elastomer to be obtained, the fluctuating level of impurities present in the case of continuous polymerization in the industrial polymerization unit, especially in the polymerization solvent, the residence time in the polymerization reactor.

A person skilled in the art will, in an industrial polymerization unit operating in continuous mode, as is known per se, adjust the quantity of alkylaluminum compound to be added separately from the catalyst system as a function of the parameter(s) taken into consideration.

According to a preferential implementation method of the invention, the separate introduction of said alkylaluminum compound is carried out by introducing all said alkylaluminum compound before introducing the catalyst system and, as a result, before the polymerization of the monomer or monomers to be polymerized or copolymerized.

Advantageously, the alkylaluminum compound added separately and advantageously before the reaction/alkylaluminum in the catalyst system molar ratio varies from 1/20 to 10/1 and according to an advantageous implementation varies from 0.05 to 3 and more preferentially from 0.05 to 1.

It should be noted, in addition, that this use for the alkylating agent/salt of rare-earth metal(s) molar ratio having a reduced value ranging from 1 to 10, more advantageously from 1 to 5, together with the prior addition of said alkylaluminum compound advantageously translates into a lower total quantity of organoaluminum(s), used both in said catalyst system and before polymerization, which involves a significant reduction in the implementation cost of the method according to the invention in comparison with a method that uses a similar catalyst system but of which the alkylating agent/salt of rare earth metal(s) molar ratio is higher and which does not include this prior addition of the organoaluminum compound.

According to another preferential feature of the invention, the amount of said alkylaluminum compound brought together with said monomer(s) to be polymerized varies from 10 to 5000 µmol per 100 g of conjugated diene monomer to be polymerized, especially as a function of the macrostructure characteristics desired for said elastomer and/or of the amount of impurities present in the polymerization medium, such as impurities stemming from recycled solvents.

It should be noted that the bringing together, separately and advantageously before polymerization, of the monomer(s) to be polymerized with said alkylaluminum compound makes it possible, according to the invention, to adjust, with great flexibility and at lower cost, the activity of the catalyst system as a function of the nature of the monomer(s) chosen and of the macrostructure characteristics of the diene elastomer obtained, such as its Mooney viscosity. It is thus possible to vary, on a unit dedicated to the polymerization of monomers with different respective reactivities and/or dedicated to producing elastomers having a wide range of Mooney viscosities ML (1+4) at 100° C., a narrow molecular weight distribution, that is to say between 25 and 100, and having cold flow properties that are quite satisfactory for use in tire treads, the activity of the catalyst system used and therefore the polymerization yield, while using one and the same catalyst system formula.

It should also be noted that this addition of said alkylaluminum compound separately and advantageously before polymerization makes it possible to control the activity of the catalyst system as a function of the polymerization conditions, such as the temperature and/or the residence time in the or each polymerization reactor, which may especially account for a gain in productivity in the case of a reduction in the residence time for obtaining an elastomer of given characteristics.

In other words, the polymerization method according to the invention has a great flexibility for use in continuous or batch polymerization, due to the fact that it makes the single catalyst system used equivalent to a range of catalyst systems having different activities.

According to another feature of the invention, said polymerization reaction may be carried out in an inert hydrocarbon-based polymerization solvent, such as cyclohexane or methylcyclohexane, or else in bulk, and at a temperature ranging preferably from 0 to 100° C.

Advantageously, the polymerization reaction is carried out continuously, said alkylaluminum compound being introduced into a line inlet located upstream of at least one polymerization reactor, then the salt of rare-earth metal(s) being introduced upstream of at least one polymerization reactor in which the monomer(s) to be polymerized is (are) introduced.

It should be noted that the separate introduction of the alkylaluminum compound may also be carried out after that of the preformed catalyst system, especially into a catalyst line inlet, of a polymerization unit operating continuously, but before polymerization of the monomer(s) to be polymerized.

According to one advantageous implementation method, the allyl precursor of lithium and the excess halogenating agent are introduced into the line inlet using a perfectly stirred dynamic mixer, followed by introduction of the salt of rare-earth metal(s) using a mixer having a static-type stirring.

It should be noted that in this case, and this being all the more so when the alkylating agent/salt of rare-earth metal(s) molar ratio is further reduced, the addition of the alkylaluminum compound before polymerization makes it possible to clear the fluctuations over time of the impurities due to polymerization solvents that are recycled into the line inlet and not to penalize, due to these fluctuations, the activity of the catalyst system, so as to minimize the dispersion of the characteristics of the elastomer obtained.

It should be noted that the addition according to the invention of said alkylaluminum compound also makes it possible to reproduce, even in the presence of such impurities, the aforementioned result obtained by a similar catalyst system, but of which the alkylating agent/salt of rare-earth metal(s) molar ratio is higher.

As the diene elastomer which may be prepared by the method according to the invention, mention may be made of any homopolymer or copolymer obtained by homopolymerization or copolymerization of at least one conjugated diene monomer having from 4 to 12 carbon atoms, optionally with a vinyl aromatic compound.

As the conjugated diene monomer(s), the following are especially suitable: 1,3-butadiene, isoprene, 2,3-di($C_1$-$C_5$ alkyl)-1,3-butadienes such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

As the vinyl aromatic compounds, the following are for example suitable: styrene, ortho-, meta-, para-methylstyrene, the commercial "vinyltoluene" blend, para-tert-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure that is a function of the polymerization conditions used, especially of the presence or absence of a modifying and/or randomizing agent and of the amounts of modifying and/or randomizing agent employed. The elastomers may, for example, be block, random, sequential or microsequential blocks, and they may be coupled and/or star-branched with a coupling and/or star-branching agent.

In a particularly preferential manner, said diene elastomer is chosen from the group of highly unsaturated diene elastomers formed by polybutadienes (BR) and synthetic polyisoprenes (IR).

It should be noted that the catalyst systems used in the method according to the invention make it possible, in particular, to obtain butadiene homopolymers having at the same time a Mooney viscosity ML (1+4) at 100° C., measured according to the ASTM D 1646 standard, which is greater than or equal to 40, a level of cis-1,4 linkages (measured by the near-infrared (NIR) assay technique, see the attached Appendix 1) which is greater than 90%, and a polydispersity index less than 2.1 (measured by the size exclusion chromatography (SEC) technique, see the attached Appendix 2).

The aforementioned features of the present invention, and also other features, will be better understood on reading the following description of several embodiment examples of the invention, given by way of illustration and non-limitingly in relation to the attached appendices.

In the examples which follow, all the reactions were carried out under nitrogen following the normal rules for handling under an inert atmosphere.

A—Examples of Butadiene Batch Polymerizations Using Catalyst Systems According to the Invention, without Prior Bringing Together of an Alkylaluminum Compound with the Butadiene to be Polymerized.

I. EXAMPLE 1

This example describes the polymerization of butadiene mainly in cis-1,4 form in cyclohexane, using a first catalyst system 1, prepared in situ according to the invention, of formula:

oligobutadienyllithium/diethylaluminum chloride/neodymium tris(2-ethylhexanoate), at molar ratios of 12/15/1.

1) In Situ Preparation of a First Catalyst System According to the Invention:

a) Preparation of the Allyl Derivative of Lithium:

Introduced, under stirring, into a Steinie bottle that had been previously washed and dried and contained a magnetic stirrer bar were:

100 ml of cyclohexane that had been previously passed over alumina and then purged with nitrogen;
15.4 ml of butadiene, and
0.037 mol of secondary butyllithium.

After stirring for one hour at room temperature, a solution of an oligobutadienyllithium comprising 5 units derived from butadiene was obtained.

In order to determine the exact titre of this solution, a Gilman assay was carried out and it was verified, by an HPLC assay of the reaction product of this solution and benzophenone as an electrophilic agent, that there was no secondary butyllithium in the lithium-bearing prepolymer solution obtained (the residual amount of secondary butyllithium must be below 0.5% of the total amount of active lithium).

b) In Situ Mixing of the Various Constituents of the Catalyst System and Polymerization:

Introduced into a 100 ml Steinie bottle were
70 g of cyclohexane;
10 g of butadiene;
300 µmol of the lithium-bearing prepolymer solution obtained in a);
375 µmol of diethylaluminum chloride; and
25 µmol of neodymium tris(2-ethylhexanoate).

The alkylating agent and the halogen donor according to the invention were thus respectively formed from the reaction product of the oligobutadienyllithium with the diethylaluminum chloride and from the diethylaluminum chloride.

The bottle was then stirred for one hour at 60° C. Thus, 9.6 g of polybutadiene were obtained, by coagulation in methanol. Next, this polymer was stabilized by addition of 100 mg of para-ethyl-ortho-di-tert-butyl phenol.

This polybutadiene had the following characteristics:
intrinsic viscosity: 1.35 dl/g;
number-average molecular weight: $M_n$=68 000 g/mol;
weight-average molecular weight: $M_w$=110 000 g/mol;
polydispersity index: $I_p$=1.7; and
level of cis-1,4 linkages: 93%.

II. EXAMPLE 2

This example describes the polymerization of butadiene mainly in cis-1,4 form in cyclohexane, using the catalyst system 2, prepared in situ, of formula:

oligoisoprenyllithium/diethylaluminum chloride/neodymium tris(2-ethylhexanoate), at molar ratios of 12/15/1.

This second catalyst system only differs from that of §I above in that the allyl derivative of lithium used is an oligoisoprenyllithium, used instead of said oligobutadienyllithium and prepared in the manner described in §I above.

This catalyst system is prepared in situ by introducing, into a Steinie bottle:
120 g of cyclohexane;
10 g of butadiene;
2400 µmol of the oligoisoprenyllithium solution;
2600 µmol of diethylaluminum chloride; and
100 µmol of neodymium tris(2-ethylhexanoate).

The alkylating agent and the halogen donor according to the invention are thus respectively formed from the reaction product of the oligoisoprenyllithium with the diethylaluminum chloride and from the diethylaluminum chloride.

The bottle was then stirred for 100 min at 60° C. Thus, 9 g of polybutadiene were obtained having the following characteristics:
intrinsic viscosity: 0.5 dl/g;
number-average molecular weight: $M_n$=51 000 g/mol;
weight-average molecular weight: $M_w$=72 000 g/mol;
polydispersity index: $I_p$=1.4; and
level of cis-1,4 linkages: 94%.

III. EXAMPLES 3 AND 4

While following the experimental procedure described in §I above, the relative amounts of butadiene and of butyllithium were varied in order to obtain two allyl derivatives of lithium, corresponding respectively to one butadienyl unit and 10 butadienyl units for the catalyst systems 3 and 4 according to the invention. Both were prepared in situ and had the formula:

(butadienyl)$_{n=1 \; or \; 10}$ lithium/diethylaluminum chloride/neodymium tris(2-ethylhexanoate), at molar ratios of 12/15/1.

The alkylating agent and the halogen donor according to the invention were thus respectively formed from the reaction product of butadienyl or decabutadienyllithium with the diethylaluminum chloride and from the diethylaluminum chloride.

Table 1 below illustrates the results obtained from the butadiene polymerization, which was carried out in the manner described in §I above.

TABLE 1

| Example No. | n | % cis-1,4 | Yield (after polymerizing for 60 min) | Intrinsic viscosity: (dl/g) | Polydispersity Index Ip |
|---|---|---|---|---|---|
| 3 | 1 | 94 | 90 | 1.5 | 1.8 |
| 4 | 10 | 93 | 95 | 1.4 | 1.7 |

IV. EXAMPLE 5

This example describes the polymerization of butadiene essentially in cis-1,4 form in cyclohexane, using the premixed catalyst system 5 of formula:

oligobutadienyllithium/diethylaluminum chloride/neodymium tris(2-ethylhexanoate), with molar ratios of 12/15/1.

This fifth catalyst system differs from that of §I above in that the catalyst system is obtained by premixing the various constituents and is prepared in the following manner:

1) Preparation of the Premixed Catalyst System 5 According to the Invention:

a) Preparation of the Allyl Derivative of Lithium:

Introduced, with stirring, into a 250 ml Steinie bottle that had previously been washed and dried and contained a magnetic stirrer bar, were:
100 ml of toluene;
15.4 ml of butadiene; and
0.037 mol of secondary butyllithium.

After stirring for one hour at room temperature, a toluene solution of an oligobutadienyllithium comprising 5 units derived from butadiene was obtained.

In order to determine the exact titre of this solution, a Gilman assay was carried out and it was verified, by an HPLC assay of the reaction product of this solution and benzophenone as an electrophilic agent, that there was no secondary butyllithium in the lithium-bearing prepolymer solution obtained (the residual amount of secondary butyllithium must be below 0.5% of the total amount of active lithium).

b) Premixing of the Various Constituents of the Catalyst System and Polymerization:

Introduced into a 50 ml bottle were:
12.7 ml of toluene;
a volume of the solution obtained in a) corresponding to 3 mmol of oligobutadienyllithium;
3.75 mmol of diethylaluminum chloride, as the halogenating agent, as a 1 M solution in toluene; and 0.25 mmol of neodymium tris(2-ethylhexanoate) as a 0.19 M solution in toluene.

The alkylating agent and the halogen donor according to the invention were thus respectively formed from the reaction product of the oligobutadienyllithium with the diethylaluminum chloride and from the diethylaluminum chloride.

Introduced into a 150 ml bottle at room temperature, immediately after obtaining the catalyst system solution, were:
- 90 ml of cyclohexane;
- 10 g of butadiene; and
- 5 ml of this catalyst system, that is to say 5 µmol of neodymium.

The bottle was then stirred at 60° C. for fifteen minutes. Then, the polymerization was stopped by injection of 1 ml of methanol, and 100 mg of 2,6-di-tert-butyl-para-ethylphenol were added, as an antioxidant, to the polybutadiene thus obtained.

6.0 g of polybutadiene were recovered, which gives a yield of 60%. This polybutadiene had the following characteristics:
- intrinsic viscosity: 1.6 dl/g;
- average molecular weights: $M_n$=95 000 g/mol and $M_w$=155 000 g/mol;
- polydispersity index: $I_p$=1.6; and
- level of cis-1,4 linkages: 93%.

V. EXAMPLE 6

This example describes the polymerization of butadiene essentially in cis-1,4 form in cyclohexane, using the premixed catalyst system 6 of formula:

oligobutadienyllithium/diethylaluminum bromide/neodymium tris(2-ethylhexanoate), with molar ratios of 12/15/1.

This sixth catalyst system differs from that of §V above in that the catalyst system involves a halogenating agent based on bromine and not based on chlorine. The catalyst system is prepared in the following manner:

1) Preparation of the Premixed Catalyst System 6 According to the Invention:

a) Preparation of the Allyl Derivative of Lithium:

Introduced, with stirring, into a 250 ml Steinie bottle that had previously been washed and dried and contained a magnetic stirrer bar, were:
- 100 ml of toluene;
- 15.4 ml of butadiene; and
- 0.037 mol of secondary butyllithium.

After stirring for one hour at room temperature, a toluene solution of an oligobutadienyllithium comprising 5 units derived from butadiene was obtained.

In order to determine the exact titre of this solution, a Gilman assay was carried out and it was verified, by an HPLC assay of the reaction product of this solution and benzophenone as an electrophilic agent, that there was no secondary butyllithium in the lithium-bearing prepolymer solution obtained (the residual amount of secondary butyllithium must be below 0.5% of the total amount of active lithium).

b) Premixing of the Various Constituents of the Catalyst System and Polymerization:

Introduced into a 50 ml bottle were:
- 12.7 ml of toluene;
- a volume of the solution obtained in a) corresponding to 3 mmol of oligobutadienyllithium;
- 3.75 mmol of diethylaluminum bromide, as the halogenating agent, as a 1 M solution in toluene; and
- 0.25 mmol of neodymium tris(2-ethylhexanoate) as a 0.19 M solution in toluene.

The alkylating agent and the halogen donor according to the invention were thus respectively formed from the reaction product of the oligobutadienyllithium with the diethylaluminum bromide and from the diethylaluminum bromide.

Introduced into a 150 ml bottle at room temperature, immediately after obtaining the catalyst system solution, were:
- 90 ml of cyclohexane;
- 10 g of butadiene; and
- 5 ml of this catalyst system, that is to say 5 µmol of neodymium.

The bottle was then stirred at 60° C. for fifteen minutes. Then, the polymerization was stopped by injection of 1 ml of methanol, and 100 mg of 2,6-di-tert-butyl-para-ethylphenol were added, as an antioxidant, to the polybutadiene thus obtained.

6.8 g of polybutadiene were recovered, which gives a yield of 68%. This polybutadiene had the following characteristics:
- intrinsic viscosity: 2.59 dl/g;
- average molecular weights: $M_n$=160 000 g/mol and $M_w$=250 000 g/mol;
- polydispersity index: $I_p$=1.5; and
- level of cis-1,4 linkages: 97%.

VI. EXAMPLE 7

This example describes the polymerization of butadiene essentially in cis-1,4 form in heptane, using a preformed catalyst system 7 of formula:

oligobutadienyllithium/diethylaluminum bromide/neodymium tris(2-ethylhexanoate), with molar ratios of 12/15/1.

This seventh catalyst system differs from that of §I in that the catalyst system is obtained by preforming and is obtained in the following manner:

1) Preparation of the Preformed Catalyst System 7 According to the Invention:

a) Preparation of the Allyl Derivative of Lithium:

Introduced, with stirring, into a 250 ml Steinie bottle that had previously been washed and dried and contained a magnetic stirrer bar, were:
- 100 ml of toluene;
- 15.4 ml of butadiene; and
- 0.037 mol of secondary butyllithium.

After stirring for one hour at room temperature, a toluene solution of an oligobutadienyllithium comprising 5 units derived from butadiene was obtained.

In order to determine the exact titre of this solution, a Gilman assay was carried out and it was verified, by an HPLC assay of the reaction product of this solution and benzophenone as an electrophilic agent, that there was no secondary butyllithium in the lithium-bearing prepolymer solution obtained (the residual amount of secondary butyllithium must be below 0.5% of the total amount of active lithium).

b) Preparation of the Preformed Catalyst and Polymerization:

Introduced into a 1 liter bottle, at a temperature of 0° C., were:
- a volume of the solution obtained in a) corresponding to 3 mmol of oligobutadienyllithium;
- 3.75 mmol of diethylaluminum bromide, as the halogenating agent, as a 2.2 M solution in toluene; and
- 0.25 mmol of neodymium tris(2-ethylhexanoate) as a 0.31 M solution in toluene.

The preformed catalyst system was obtained by stirring the mixture thus obtained at a temperature of 60° C. for 120 minutes, then it was stored at a temperature of −20° C. until use.

The alkylating agent and the halogen donor according to the invention were thus respectively formed from the reaction product of the oligobutadienyllithium with the diethylaluminum bromide and from the diethylaluminum bromide.

Introduced into a 250 ml bottle, at room temperature, were:
102 ml of heptane;
10 g of butadiene; and
a volume of the solution obtained in 1) b) corresponding to 20 µmol of neodymium.

The bottle was then stirred at 60° C. for thirty minutes. Then, the polymerization was stopped by injection of 1 ml of methanol, and 100 mg of 2,6-di-tert-butyl-para-ethylphenol were added, as an antioxidant, to the polybutadiene thus obtained.

9.7 g of polybutadiene were recovered, having the following characteristics:
intrinsic viscosity: 2.44 dl/g;
average molecular weights: $M_n$=130 000 g/mol and $M_w$=220 000 g/mol;
polydispersity index: $I_p$=1.7; and
level of cis-1,4 linkages: 94%.

VII. EXAMPLE 8

This example describes the polymerization of butadiene essentially in cis-1,4 form in heptane, using a preformed catalyst system 8 of formula:

oligobutadienyllithium/diethylaluminum bromide/neodymium tris(2-ethylhexanoate), with molar ratios of 12/15/1.

This eighth catalyst system differs from that of §VII in that the preforming time of the catalyst system is not the same.

1) Preparation of the Preformed Catalyst System 8 According to the Invention:

a) Preparation of the Allyl Derivative of Lithium:

Introduced, with stirring, into a 250 ml Steinie bottle that had previously been washed and dried and contained a magnetic stirrer bar, were:
100 ml of toluene;
15.4 ml of butadiene; and
0.037 mol of secondary butyllithium.

After stirring for one hour at room temperature, a toluene solution of an oligobutadienyllithium comprising 5 units derived from butadiene was obtained.

In order to determine the exact titre of this solution, a Gilman assay was carried out and it was verified, by an HPLC assay of the reaction product of this solution and benzophenone as an electrophilic agent, that there was no secondary butyllithium in the lithium-bearing prepolymer solution obtained (the residual amount of secondary butyllithium must be below 0.5% of the total amount of active lithium).

b) Preparation of the Preformed Catalyst:

Introduced into a 1 liter bottle, at a temperature of 0° C., were:
a volume of the solution obtained in a) corresponding to 3 mmol of oligobutadienyllithium;
3.75 mmol of diethylaluminum bromide, as the halogenating agent, as a 2.2 M solution in toluene; and
0.25 mmol of neodymium tris(2-ethylhexanoate) as a 0.31 M solution in toluene.

The preformed catalyst system was obtained by stirring the mixture thus obtained at a temperature of 60° C. for 15 minutes, then it was stored at a temperature of −20° C. until use.

The alkylating agent and the halogen donor according to the invention were thus respectively formed from an oligobutadienylaluminum and from the diethylaluminum bromide.

Introduced into a 250 ml bottle, at room temperature, were:
102 ml of heptane;
10 g of butadiene; and
a volume of the solution obtained in 1) b) corresponding to 16 µmol of neodymium.

The bottle was then stirred at 60° C. for thirty minutes. Then, the polymerization was stopped by injection of 1 ml of methanol, and 100 mg of 2,6-di-tert-butyl-para-ethylphenol were added, as an antioxidant, to the polybutadiene thus obtained.

9.8 g of polybutadiene were recovered, having the following characteristics:
intrinsic viscosity: 2.88 dl/g;
average molecular weights: $M_n$=130 000 g/mol and $M_w$=250 000 g/mol;
polydispersity index: $I_p$=1.9; and
level of cis-1,4 linkages: 93%.

VIII. EXAMPLE 9

This example describes the polymerization of butadiene essentially in cis-1,4 form in methylcyclohexane, using a premixed catalyst system 9 of formula:

oligobutadienyllithium/diethylaluminum bromide/neodymium tris(2-ethylhexyl)phosphate, with molar ratios of 6/9/1.

This ninth premixed catalyst system differs from that of §VI in that it involves a neodymium salt of the neodymium tris(phosphate) type and is prepared in the following manner:

1) Preparation of the Premixed Catalyst System 9 According to the Invention:

a) Preparation of the Allyl Derivative of Lithium:

Introduced, with stirring, into a 250 ml Steinie bottle that had previously been washed and dried and contained a magnetic stirrer bar, were:
100 ml of toluene;
15.4 ml of butadiene; and
0.037 mol of secondary butyllithium.

After stirring for one hour at room temperature, a toluene solution of an oligobutadienyllithium comprising 5 units derived from butadiene was obtained.

In order to determine the exact titre of this solution, a Gilman assay was carried out and it was verified, by an HPLC assay of the reaction product of this solution and benzophenone as an electrophilic agent, that there was no secondary butyllithium in the lithium-bearing prepolymer solution obtained (the residual amount of secondary butyllithium must be below 0.5% of the total amount of active lithium).

b) Premixing of the Various Constituents of the Catalyst System and Polymerization:

Introduced into a 50 ml bottle were:
12.7 ml of methylcyclohexane;
a volume of the solution obtained in a) corresponding to 3 mmol of oligobutadienyllithium;
3.75 mmol of diethylaluminum chloride, as the halogenating agent, as a 1.6 M solution in methylcyclohexane, and
then the contents of the bottle were decanted into a second 50 ml bottle containing 0.5 mmol of neodymium tris(2-ethylhexyl)phosphate in the form of a gel in the methylcyclohexane.

The alkylating agent and the halogen donor according to the invention were thus respectively formed from the reaction product of the oligobutadienyllithium with the diethylaluminum bromide and from the diethylaluminum bromide.

Introduced into a 150 ml bottle at room temperature, immediately after obtaining the catalyst system obtained in 1) b), were:

- 90 ml of methylcyclohexane;
- 10 g of butadiene; and
- a volume of the catalyst solution corresponding to 5 μmol of neodymium.

The bottle was then stirred at 60° C. for fifteen minutes. Then, the polymerization was stopped by injection of 1 ml of methanol, and 100 mg of 2,6-di-tert-butyl-para-ethylphenol was added, as an antioxidant, to the polybutadiene thus obtained.

9.8 g of polybutadiene were recovered, which gives a yield of 98%. This polybutadiene had the following characteristics:

- intrinsic viscosity: 2.65 dl/g;
- average molecular weights: $M_n$=143 000 g/mol and $M_w$=190 000 g/mol;
- polydispersity index: $I_p$=1.4; and
- level of cis-1,4 linkages: 94%.

IX. EXAMPLE 10

This example describes the polymerization of butadiene essentially in cis-1,4 form in methylcyclohexane, using a preformed catalyst system 10 of formula:

oligobutadienyllithium/diethylaluminum bromide/neodymium tris(2-ethylhexyl)phosphate, with molar ratios of 6/9/1.

This tenth preformed catalyst system differs from that of §VII in that it involves a neodymium salt of the neodymium tris(phosphate) type and is prepared in the following manner:

1) Preparation of the Preformed Catalyst System 10 According to the Invention:

a) Preparation of the Allyl Derivative of Lithium:

Introduced, with stirring, into a 250 ml Steinie bottle that had previously been washed and dried and contained a magnetic stirrer bar, were:

- 100 ml of toluene;
- 15.4 ml of butadiene; and
- 0.037 mol of secondary butyllithium.

After stirring for one hour at room temperature, a toluene solution of an oligobutadienyllithium comprising 5 units derived from butadiene was obtained.

In order to determine the exact titre of this solution, a Gilman assay was carried out and it was verified, by an HPLC assay of the reaction product of this solution and benzophenone as an electrophilic agent, that there was no secondary butyllithium in the lithium-bearing prepolymer solution obtained (the residual amount of secondary butyllithium must be below 0.5% of the total amount of active lithium).

b) Preparation of the Preformed Catalyst:

Introduced into a 100 ml bottle, at a temperature of 0° C., were:

- a volume of the solution obtained in a) corresponding to 3 mmol of oligobutadienyllithium;
- 3.75 mmol of diethylaluminum bromide, as the halogenating agent, as a 1.6 M solution in methylcyclohexane, and then the contents of the bottle were decanted into a second 50 ml bottle containing 0.5 mmol of neodymium tris(2-ethylhexyl)phosphate in the form of a gel in the methylcyclohexane.

The preformed catalyst system was obtained by stirring the mixture thus obtained at a temperature of 60° C. for 120 minutes, then it was stored at a temperature of −20° C. until use.

The alkylating agent and the halogen donor according to the invention were thus respectively formed from the reaction product of the oligobutadienyllithium with the diethylaluminum bromide and from the diethylaluminum bromide.

2) Polymerization of Butadiene:

Introduced into a 250 ml bottle, at room temperature, were:

- 102 ml of heptane;
- 10 g of butadiene; and
- a volume of the solution obtained in 1) b) corresponding to 5 μmol of neodymium.

The bottle was then stirred at 60° C. for thirty minutes. Then, the polymerization was stopped by injection of 1 ml of methanol, and 100 mg of 2,6-di-tert-butyl-para-ethylphenol were added, as an antioxidant, to the polybutadiene thus obtained.

9.9 g of polybutadiene were recovered, having the following characteristics:

- intrinsic viscosity: 2.7 dl/g;
- average molecular weights: $M_n$=136 000 g/mol and $M_w$=220 000 g/mol;
- polydispersity index: $I_p$=1.6; and
- level of cis-1,4 linkages: 94%.

The results of these examples of batch polymerization, without prior bringing together of an alkylaluminum compound with the butadiene to be polymerized, are given in Table 2 below.

In the case where the catalyst system is formed in situ from a neodymium carboxylate type salt and a chlorinated halogenating agent, the molecular weight of the oligobutadienyllithium compound s(PB)$_n$Li has little effect on the polymerization parameters. It was observed that when n varies from 1 to 10, the characteristics of the polymers are not changed. The polydispersity index remains low and equal to 1.8, (Examples 1 and 3-4).

Relative to the systems formed in situ, the use of a premixed system makes it possible to attain higher molecular weight values with a better activity, while retaining a narrow polydispersity index (Example 5). This use together with a brominated rather than chlorinated halogenating agent makes it possible to further increase the molecular weight values (Example 6).

Relative to the premixed systems, the preformed systems result in polymers having similar molecular weights but the distribution of the molecular weights is widened (Examples 7 and 8). Whatever the preforming time of the catalyst system, the latter method of preparing a catalyst system according to the invention does not provide a significant improvement relative to the systems obtained by premixing.

Thus, during these batch polymerization tests, the best results were obtained with the catalyst system processed by premixing and in the presence of a brominated halogenating agent (Example 6).

In the case where the catalyst system was prepared from a neodymium phosphate type salt, it was observed that the results were better than with a neodymium carboxylate type salt, both in terms of the activity and the molecular weights and polydispersity index (Examples 9 and 10).

TABLE 2

Summary of the batch polymerization tests

| | | POLYMERIZATION | | | | CHARACTERISTICS OF THE POLYBUTADIENES OBTAINED | | | |
|---|---|---|---|---|---|---|---|---|---|
| Example | Catalyst system | Molar ratio | Embodiment | Nd (µMcm) | Conversion % | $M_n$ (g/mol) | $I_p$ | Intrinsic viscosity (dl/g) | cis-1,4 (%) |
| 1 | 1: s(PB)$_5$Li/DEAC/Nd(Carb.) | 12/15/1 | In situ | 250 | 96 | 68 000 | 1.7 | 1.35 | 93 |
| 2 | 2: s(PI)$_5$Li/DEAC/Nd(Carb.) | 12/15/1 | In situ | 1000 | 90 | 51 000 | 1.4 | 0.5 | 94 |
| 3 | 3: s(PB)$_1$Li/DEAC/Nd(Carb.) | 12/15/1 | In situ | 250 | 90 | 65 000 | 1.8 | 1.5 | 94 |
| 4 | 4: s(PB)$_{10}$Li/DEAC/Nd(Carb.) | 12/15/1 | In situ | 250 | 95 | 69 000 | 1.7 | 1.4 | 93 |
| 5 | 5: s(PB)$_5$Li/DEAC/Nd(Carb.) | 12/15/1 | Premixing | 50 | 60 | 95 000 | 1.6 | 1.6 | 93 |
| 6 | 6: s(PB)$_5$Li/DEAB/Nd(Carb.) | 12/15/1 | Premixing | 50 | 68 | 160 000 | 1.5 | 2.59 | 97 |
| 7 | 7: s(PB)$_5$Li/DEAB/Nd(Carb.) | 12/15/1 | Preforming 120 min. at 60° C. | 200 | 97 | 130 000 | 1.7 | 2.44 | 94 |
| 8 | 8: s(PB)$_5$Li/DEAB/Nd(Carb.) | 12/15/1 | Preforming 15 min. at 60° C. | 160 | 98 | 130 000 | 1.9 | 2.88 | 93 |
| 9 | 9: s(PB)$_5$Li/DEAB/Nd(Phosp.) | 6/9/1 | Premixing | 50 | 98 | 143 000 | 1.4 | 2.65 | 94 |
| 10 | 10: s(PB)5Li/DEAB/Nd(Phosp.) | 6/9/1 | Preforming | 50 | 99 | 136 000 | 1.6 | 2.70 | 94 |

In the table, the notation s(PB)$_n$Li or (s(PI)$_n$Li) represents the oligobutadienyllithium compound comprising n units derived from butadiene or isoprene respectively,
DEAC or DEAB represents diethylaluminium chloride or bromide respectively,
Nd(Carb.) represents the neodymium tris(2-ethylhexanoate) and
Nd(Phosp.) represents the neodymium tris[bis(2-ethylhexyl)phosphate].

B. Examples of Continuous Polymerization of Butadiene Using Premixed Catalyst Systems According to the Invention, without Prior Bringing Together of an Alkylaluminum Compound with the Butadiene to be Polymerized

I. PROCEDURE FOLLOWED FOR THE VARIOUS POLYMERIZATIONS

Each polymerization was carried out in these examples on a continuous line having two identical reactors R1 and R2 in series, with a volume equal to 32.5 l and equipped with a system of mechanical stirring via blades.

The solution of the allyl derivative of lithium in toluene and the halogenating agent were injected into a line entry in a dynamic mixer (contact time 1 to 5 minutes), then the neodymium salt was added to the outlet of this dynamic mixer. The catalyst solution was then premixed using one or more static mixers for a contact time between 3 and 30 minutes. The catalyst thus prepared was injected directly into the first reactor RI, in the stream of the solution of butadiene to be polymerized dissolved in the polymerization solvent (cyclohexane).

The residence times per reactor were set at between 15 and 30 minutes and the temperature was maintained at 60° C.

The polymerization stopper and the antioxidant used were the same as in §. A above, and they were injected one after the other on leaving the reactors, upstream of the static mixers.

The amount of neodymium in each catalyst system is expressed in µmol per 100 g of butadiene monomer (amount expressed in µMcm hereinafter).

Thus, the premixed catalysts according to the invention were tested (cf. Tables 3 and 4).

II. POLYMERIZATION TESTS CARRIED OUT USING THE CATALYST SYSTEMS

1) Tests A to F According to the Invention Carried Out Using Said Premixed Catalyst System, Said Halogenating Agent Being Diethylaluminum Chloride (Abbreviated Hereinafter as DEAC):

The results from Table 3 illustrate the behaviour of premixed catalyst systems according to the invention when the halogenating agent is based on chlorine.

It should be noted that the premixing time and also the residence time has little effect on the level of cis-1,4 units present in the polymer. The level of cis-1,4 units is approximately the same whatever the conditions are and is between 94 and 96%.

The polydispersity index is overall low, between 1.4 and 1.9. It should be noted that the minimum value of the polydispersity index has been obtained for the longest (30 minutes) premixing time and the shortest (45 minutes) residence time.

Furthermore, it should be noted that the degree of monomer conversion is greater the longer the premixing time. By varying this together with the residence time, it is possible to adjust the characteristics of the synthesized polymer, in terms of:
  molecular weights,
  polydispersity index;
  intrinsic viscosity; and
  Mooney viscosity.

For example, a good $M_n/I_p$ compromise is obtained for a residence time of 45 minutes and a premixing time of 30 minutes (test F).

TABLE 3

| | | | POLYMERIZATION | | | | | CHARACTERISTICS OF THE POLYBUTADIENES OBTAINED | | | | | |
|---|---|---|---|---|---|---|---|---|---|---|---|---|---|
| Test | Catalyst system sPB$_5$Li/ DEAC/Nd | Nd (μMcm) | Premixing time | S/M | Total residence time (R1 + R2) | CR1 % | CR2 % | ML | Intrinsic viscosity dl/g | cis-1,4 (%) | trans-1,4 (%) | 1,2 (%) | M$_n$ (g/mol) | Ip |
| A | 12/16/1 | 30 | 5 | 5 | 60 | 30 | 38 | — | 1.3 | 94 | 5 | 1 | 74 000 | 1.7 |
| B | 12/16/1 | 30 | 5 | 5 | 45 | 25 | 31 | — | 0.9 | 94 | 5 | 1 | 63 000 | 1.8 |
| C | 12/16/1 | 30 | 15 | 5 | 60 | 39 | 45 | 45 | 1.9 | 95 | 3 | 1 | 105 000 | 1.9 |
| D | 12/16/1 | 30 | 15 | 5 | 45 | 31 | 36 | 45 | 1.4 | 96 | 3 | 1 | 92 000 | 1.8 |
| E | 12/16/1 | 30 | 30 | 5 | 60 | 49 | 54 | 50 | 2.1 | 95 | 4 | 1 | 125 000 | 1.8 |
| F | 12/16/1 | 30 | 30 | 5 | 45 | 30 | 41 | 45 | 1.8 | 94 | 5 | 1 | 103 000 | 1.5 | sPB$_5$Li denotes the allyl derivative of lithium (oligobutadienyllithium comprising 5 units derived from butadiene),
Nd represents neodymium tris(2-ethylhexanoate),
S/M represents the solvent/monomer ratio introduced into the line inlet,
CR1 and CR2 are the monomer conversions at the exit of reactors R1 and R2 respectively.

2) Tests G to L According to the Invention Carried Out Using Said Premixed Catalyst System, Said Halogenating Agent Being Diethylaluminum Bromide (Abbreviated Hereinafter to DEAB):

The results from Table 4 illustrate the behaviour of the premixed catalyst systems according to the invention, when the halogenating agent is based on bromine.

It should be noted that the premixing time, the residence time or the amount of neodymium introduced have little effect on the level of cis-1,4 units present in the polymer. The level of cis-1,4 units is approximately the same whatever the conditions are and is between 96 and 98%.

The polydispersity index is overall low, between 1.8 and 2.1. It should be noted that the minimum value of the polydispersity index has been obtained for the longest (30 minutes) premixing time and the shortest (45 minutes) residence time.

The comparison of these results with those from the preceding section B.II.1) shows that the nature of the halogenating agent has an effect on the characteristics of the polymer synthesized (tests C and G). The halogenating agent based on bromine results in higher polydispersity indices.

Furthermore, it should be noted that an increase in the amount of neodymium salt introduced into the polymerization medium logically results in higher degrees of monomer conversion (tests J to L). As before, by varying the premixing time and/or the residence time, it is possible to adjust the characteristics of the synthesized polymers, in terms of:

molecular weights;

polydispersity index;

intrinsic viscosity; and

Mooney viscosity.

For example, a good $M_n/I_P$ compromise is obtained for a residence time of 45 minutes and a premixing time of 30 minutes (test L).

TABLE 4

| | | | POLYMERIZATION | | | | | CHARACTERISTICS OF THE POLYBUTADIENES OBTAINED | | | | | |
|---|---|---|---|---|---|---|---|---|---|---|---|---|---|
| Test | Catalyst system sPB$_5$Li/ DEAB/Nd | Nd (μMcm) | Premixing time | S/M ratio | Total residence time (R1 + R2) | CR1 % | CR2 % | ML | Intrinsic viscosity dl/g | cis-1,4 (%) | trans-1,4 (%) | 1,2 (%) | M$_n$ (g/mol) | Ip |
| G | 12/16/1 | 30 | 15 | 5 | 60 | 50 | 58 | 45 | 2.35 | 98 | 1 | 1 | 109 000 | 2.1 |
| H | 12/16/1 | 35 | 15 | 5 | 60 | 59 | 66 | 50 | 2.2 | 97 | 2 | 1 | 115 000 | 2.0 |
| I | 12/16/1 | 40 | 15 | 5 | 60 | 60 | 64 | 45 | 2.15 | 98 | 1 | 1 | 116 000 | 2.0 |
| J | 12/16/1 | 50 | 15 | 5 | 60 | 85 | 90 | 65 | 2.6 | 98 | 1 | 1 | 133 000 | 2.1 |
| K | 12/16/1 | 50 | 15 | 5 | 45 | 71 | 74 | 50 | 2.4 | 96 | 3 | 1 | 114 000 | 2.0 |
| L | 12/16/1 | 50 | 30 | 5 | 45 | 74 | 79 | 55 | 2.4 | 98 | 1 | 1 | 117 000 | 1.8 | sPB$_5$Li denotes the allyl derivative of lithium (oligobutadienyllithium comprising 5 units derived from butadiene),
S/M represents the solvent/monomer ratio introduced into the line inlet, and
CR1 and CR2 are the monomer conversions at the exit of reactors R1 and R2 respectively.

The priority document FR 06/03594, filed Apr. 14, 2006, is incorporated herein by reference in its entirety.

Appendix: 1: Determination of the Microstructure of the Polybutadienes Obtained

The near-infrared (NIR) assay technique was used. This is an indirect method requiring "reference" elastomers whose microstructure has been measured by the $^{13}$C NMR technique. The quantitative relationship (Beer-Lambert law) that exists between the distribution of monomers in an elastomer and the shape of the elastomer NIR spectrum is used. This technique is carried out in two steps:

1) Calibration:
The respective spectra of the "reference" elastomers are acquired.
A mathematical model is established associating one microstructure with a given spectrum, this being done using the method of partial least squares (PLS) regression that rests on a factorial analysis of the spectral data. The following two documents relate, in an in-depth manner, to the theory and use of this method for analysing "multivariant" data:
(1) P. Geladi and B. R. Kowalski "Partial Least Squares regression: a tutorial",
Analytica Chimica Acta, Vol. 185, 1-17 (1986).
(2) M. Tenenhaus
"La régression PLS—Théorie et pratique"
Paris, Editions Technip (1998).
2) Measurement:
The spectrum of the sample was recorded.
The microstructure was calculated.

Appendix 2: Determination of the Molecular Weight Distribution of the Polybutadienes Obtained Via the Size Exclusion Chromatography (SEC) Technique a) Measurement Principle:
Size exclusion chromatography (SEC) makes it possible to physically separate the macromolecules according to their size in the swollen state through columns filled with a porous stationary phase. The macromolecules are separated by their hydrodynamic volume, those with the largest volumes being eluted first.

Without being an absolute method, SEC allows the molecular weight distribution of a polymer to be assessed. The various number-average ($M_n$) and weight-average ($M_w$) molecular weights may be determined and the polydispersity index ($I_p = M_w/M_n$) calculated from commercial standards.

b) Preparation of the Polymer:
There is no particular treatment of the polymer sample before analysis. It is simply dissolved in tetrahydrofuran at a concentration of about 1 g/l.

c) SEC Analysis:
Case c1) The equipment used is a Waters Alliance chromatograph. The eluting solvent is tetrahydrofuran, the flow rate is 1 ml/min, the temperature of the system is 35° C. and the analysis time is 90 min. A set of two columns having the commercial name Styragel HT6E is used.

The injected volume of the polymer sample solution is 100 µl. The detector is a Waters 2140 differential refractometer and the software for processing the chromatographic data is the Waters Millenium system.

Case c2) The equipment used is a Waters chromatograph, model 150C. The eluting solvent is tetrahydrofuran, the flow rate is 0.7 ml/min, the temperature of the system is 35° C. and the analysis time is 90 min. A set of four columns is used in series, the columns having the commercial names Shodex KS807, Waters Styragel HMW7 and Waters Styragel HMW6E (two columns).

The injected volume of the polymer sample solution is 100 µl. The detector is a Waters model RI32X differential refractometer and the software for processing the chromatographic data is the Waters Millenium system (version 3.00).

The invention claimed is:

1. A method for preparing a diene elastomer having a level of cis-1,4 linkages of greater than 90% and a polydispersity index of less than or equal to 2.1, comprising a continuous or batch reaction of a catalyst system with at least one conjugated diene monomer to be polymerized, wherein said catalyst system is based on at least:
optionally one preforming conjugated diene;
one salt of one or more rare earth metals;
an inert hydrocarbon-based solvent;
an alkylating agent comprising an allyl derivative of aluminum of formula $R''_n AlR'_{3-n}$, where R' is a saturated or unsaturated alkyl group or else a hydride, where R" is an allyl group and where n is an integer inclusively between 1 and 3; and
a halogen donor that belongs to the family of alkylaluminum halides, excluding alkylaluminum sesquihalides.

2. The method according to claim 1, wherein said method comprises a bringing together, separate from the constituents of the catalyst system used for the continuous or batch polymerization reaction, of the monomer(s) to be polymerized with at least one alkylaluminum compound of formula $AlR_3$ or $HAlR_2$ or $R''_n AlR'_{3-n}$, where R is an alkyl group and H is a hydrogen atom, R' and R" are as defined above, chosen as a function of the characteristics of the polymerization medium and/or the polymerization conditions and/or said elastomer to be obtained, and in that said catalyst system is based on at least:
optionally one preforming conjugated diene;
one salt of one or more rare earth metals;
an inert hydrocarbon-based solvent;
an alkylating agent comprising an allyl derivative of aluminum of formula $R''_n AlR'_{3-n}$, where R' is a saturated or unsaturated alkyl group or else a hydride, where R" is an allyl group and where n is an integer inclusively between 1 and 3; and
a halogen donor that belongs to the family of alkylaluminum halides, excluding alkylaluminum sesquihalides.

3. The method according to claim 2, wherein said alkylaluminum compound of formula $AlR_3$ or $HAlR_2$ or $R''_n AlR'_{3-n}$, is added prior to the polymerization reaction in a predetermined quantity, chosen as a function of the characteristics of the polymerization medium and/or the polymerization conditions and/or said elastomer to be obtained.

4. The method according to claim 1, wherein said allyl group contained in said allyl derivative of aluminum is selected from the group consisting of butadienyl, isoprenyl, oligobutadienyl and oligoisoprenyl derivatives.

5. The method according to claim 1, wherein said allyl derivative of aluminum comprises the product of the reaction of an allyl derivative of lithium of formula R"Li with a halogenating agent of formula $X_n AlR'_{3-n}$, where X is a halogen and where R', R" and n are as defined above.

6. The method according to claim 5, wherein said allyl derivative of lithium is an oligobutadienyllithium or an oligoisoprenyllithium.

7. The method according to claim 5, wherein said halogen donor corresponds to said halogenating agent of formula $X_n AlR'_{3-n}$ used in excess, which has only partially reacted with said allyl derivative of lithium in order to obtain said allyl derivative of aluminum.

8. The method according to claim 5, wherein said halogenating agent is based on bromine.

9. The method according to claim 8, wherein said halogenating agent is an alkylaluminum monobromide.

10. The method according to claim 5, wherein said halogenating agent is based on chlorine.

11. The method according to claim 10, wherein said halogenating agent is an alkylaluminum monochloride.

12. The method according to claim 5, wherein said catalyst system is obtained by directly premixing said solvent, said allyl derivative of lithium, said halogenating agent present in excess in order to obtain said alkylating agent and also said halogen donor and said salt.

13. The method according to claim 5, wherein said catalyst system is obtained by in situ reaction in the solvent of the allyl derivative of lithium, of the halogenating agent and of the salt of rare-earth metal(s).

14. The method according to claims 5, wherein said catalyst system is obtained by preforming, in the solvent, the allyl derivative of lithium, the halogenating agent and the salt of rare-earth metal(s).

15. The method according to claim 1, wherein the alkylating agent/salt of rare-earth metal(s) molar ratio in said catalyst system has a value ranging from 1 to 20.

16. The method according to claim 15, wherein the halogen donor/salt of rare-earth metal(s) molar ratio in said catalyst system has a value ranging from 2 to 3.5.

17. The method according to claim 2, wherein the amount of said alkylaluminum compound of formula $AlR_3$ or $HAlR_2$ or $R''_n AlR'_{3-n}$, added separately and brought together with said monomer(s) to be polymerized varies from 10 to 5000 μmol per 100 g of conjugated diene monomer to be polymerized.

18. The method according to claim 2, wherein said polymerization reaction is carried out continuously, said alkylaluminum compound being introduced into a line inlet located upstream of at least one polymerization reactor, then the salt of rare-earth metal(s) being introduced upstream of at least one polymerization reactor in which the monomer(s) to be polymerized is (are) introduced.

19. The method according to claim 18, wherein the allyl derivative of alkylaluminum, is introduced into the line inlet using a perfectly stirred dynamic mixer and the salt of rare-earth metal(s) is introduced into the line inlet using a mixer having a static stirring.

20. The method according to claim 2, wherein said reaction is carried out in an inert hydrocarbon-based polymerization solvent or else in bulk.

21. The method according to claim 2, wherein said alkylaluminum compound is diisobutylaluminum hydride.

22. The method according to claim 2, wherein said salt is a tris[bis(2-ethylhexyl)phosphate] of rare-earth metal(s).

23. The method according to claim 2, wherein said conjugated diene monomer is butadiene, in order to obtain a butadiene homopolymer having at the same time a Mooney viscosity ML(1+4) at 100° C., measured according to the ASTM D 1646 standard, which is greater than or equal to 40, a polydispersity index of less than or equal to 2.1 and a level of cis-1,4 linkages of greater than 90%.

* * * * *